(12) United States Patent
Morovic et al.

(10) Patent No.: US 10,560,608 B2
(45) Date of Patent: Feb. 11, 2020

(54) IMAGING PIPELINE PROCESSING

(71) Applicants: Jan Morovic, Colchester (GB); Peter Morovic, Sant Cugat del Valles (ES); HEWLETT-PACKARD DEVELOPMENT COMPANY, L.P., Houston, TX (US)

(72) Inventors: Jan Morovic, Colchester (GB); Peter Morovic, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 15/766,090

(22) PCT Filed: Jan. 20, 2016

(86) PCT No.: PCT/EP2016/051158
§ 371 (c)(1),
(2) Date: Apr. 5, 2018

(87) PCT Pub. No.: WO2017/125151
PCT Pub. Date: Jul. 27, 2017

(65) Prior Publication Data
US 2018/0316827 A1    Nov. 1, 2018

(51) Int. Cl.
*H04N 1/41*    (2006.01)
*H04N 1/60*    (2006.01)
*G06T 1/20*    (2006.01)
*B33Y 50/00*    (2015.01)
(Continued)

(52) U.S. Cl.
CPC ............ *H04N 1/6063* (2013.01); *B33Y 50/00* (2014.12); *G06F 3/122* (2013.01); *G06F 3/1239* (2013.01);
(Continued)

(58) Field of Classification Search
CPC .. H04N 1/6063; H04N 1/6066; H04N 1/6072; H04N 1/40068; H04N 1/644
See application file for complete search history.

(56) References Cited

U.S. PATENT DOCUMENTS 6,115,134 A * 9/2000 Creel .................... G06K 15/02
358/1.16
6,246,396 B1 * 6/2001 Gibson ................. G06F 9/3879
345/549
(Continued)

FOREIGN PATENT DOCUMENTS

EP    1798954        6/2007
EP    1798954 A1 *   6/2007    ......... H04N 1/40062

OTHER PUBLICATIONS

K. Vidimce et al; "OpenFab: A Programmable Pipeline for Multi-Material Fabrication"; Jul. 2013; http://dl.acm.org/citation.cfm?id=2461993.

*Primary Examiner* — Ted W Barnes
(74) *Attorney, Agent, or Firm* — HP Inc. Patent Department

(57) ABSTRACT

A method of processing data in a multi-stage imaging pipeline, the method comprising, at each stage of the multi-stage imaging pipeline, identifying a plurality of encoding values represented in received input data in a given encoding space for the respective pipeline stage, the identified plurality of encoding values comprising a subset of encoded values which are capable of being represented in the given encoding space, generating a list of encoding indices corresponding to the identified plurality of encoded values in the given encoding space, representing the encodings of one or more entities of the received input data using the generated list of encoding indices, and outputting the represented encodings of the one or more entities to the next stage of the multi-stage imaging pipeline.

16 Claims, 4 Drawing Sheets

(51) Int. Cl.
*G06F 3/12* (2006.01)
*H04N 1/40* (2006.01)

(52) U.S. Cl.
CPC ........... *G06T 1/20* (2013.01); *H04N 1/40068* (2013.01); *H04N 1/41* (2013.01)

(56) References Cited

U.S. PATENT DOCUMENTS

| | | | |
|---|---|---|---|
| 7,551,299 B2* | 6/2009 | Ferlitsch | G06F 3/1205 358/1.13 |
| 7,692,666 B1 | 4/2010 | Bourgoin et al. | |
| 8,558,842 B1* | 10/2013 | Johnson | G06T 15/005 345/502 |
| 8,928,690 B2* | 1/2015 | Brennan | G06T 15/005 345/428 |
| 2004/0027609 A1* | 2/2004 | Isaka | B41B 27/00 358/1.15 |
| 2004/0070791 A1 | 4/2004 | Pattusamy | |
| 2006/0176310 A1* | 8/2006 | Arnaud | G06T 11/40 345/582 |
| 2008/0030513 A1* | 2/2008 | Jiao | G06T 15/005 345/530 |
| 2008/0143733 A1* | 6/2008 | Brothers | G06T 1/60 345/558 |
| 2008/0144952 A1* | 6/2008 | Chen | H04N 19/12 382/239 |
| 2010/0104221 A1* | 4/2010 | Yeung | G06T 3/60 382/297 |
| 2012/0281007 A1* | 11/2012 | Nystad | H04N 19/90 345/587 |
| 2013/0251256 A1* | 9/2013 | Deng | G06T 9/00 382/166 |
| 2014/0324204 A1* | 10/2014 | Vidimce | B29C 67/0088 700/98 |
| 2015/0091902 A1* | 4/2015 | Pediredla | G06T 15/80 345/426 |
| 2015/0195423 A1* | 7/2015 | Puigardeu Aramendia | H04N 1/41 358/1.9 |
| 2015/0379684 A1* | 12/2015 | Ramani | G06T 1/60 345/531 |
| 2017/0345125 A1* | 11/2017 | Golas | G06T 11/40 |
| 2018/0001566 A1* | 1/2018 | Morovic | H04N 1/405 |

* cited by examiner

IMAGING PIPELINE PROCESSING

BACKGROUND

The storage, memory and processing properties of imaging pipelines in three dimensional (3D) printing are significant and grow exponentially with the number of dimensions used to encode inputs as well as intermediate spaces. In the case of colour, using 8 bits per red, green, blue (RGB) channel per voxel results in a sizeable memory footprint and processing such data also results in use of significant processing resources, all of which adds to the total cost of owning and operating systems such as 3D printing system and 3D computer aided design (CAD) systems. Furthermore, the challenge becomes more severe as the number of dimensions of input or intermediate data grows. For example, in the case of colour, three 8-bit values (for RGB) are typically used.

BRIEF DESCRIPTION OF THE DRAWINGS

Various features of the present disclosure will be apparent from the detailed description which follows, taken in conjunction with the accompanying drawings, which together illustrate certain example features, and wherein.

DETAILED DESCRIPTION

Figure 1:
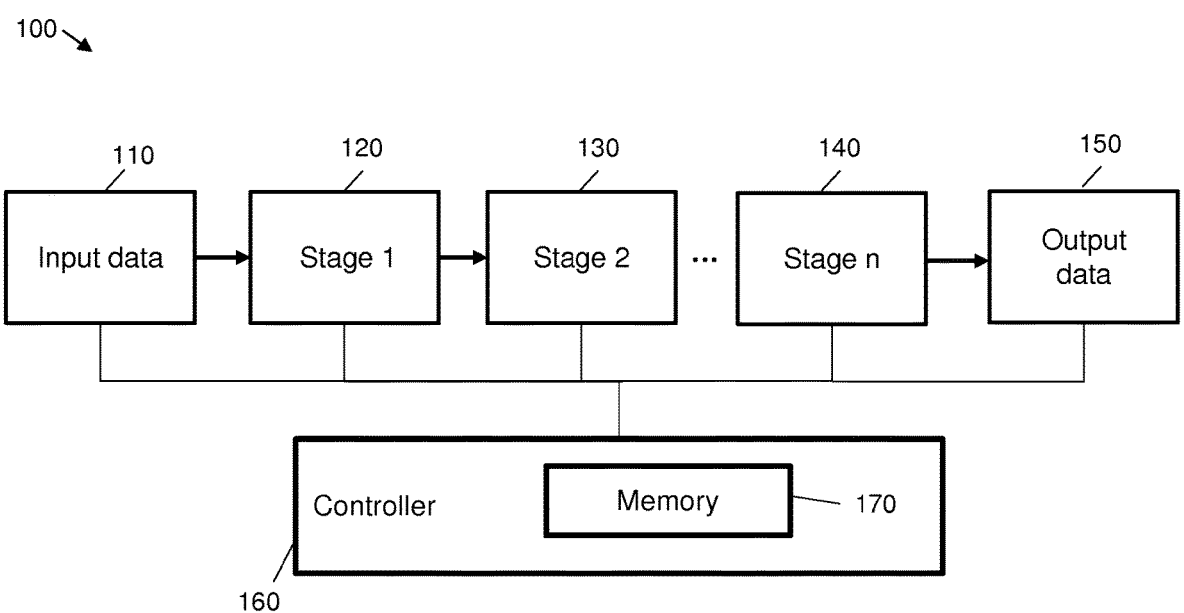
FIG. 1 is a schematic diagram showing a multi-stage imaging pipeline according to examples.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Existing approaches to reducing the memory requirements of the 3D printing pipeline, range from more efficient representations of geometry (e.g., via octrees) to a palette approach. The former can make geometric representation more efficient, but what is stored for each octree entry still has full colour encoding. The latter is more efficient in representing colour content, but still treats each stage in the pipeline the same. Also, a palette approach may not be well equipped to deal with, for example, texture-mapped bitmaps When printing 3D objects, a challenge is handling the quantity of data used to represent a print job at different stages from input to final printing instructions. In the case of colour content, encoding the full input space throughout the imaging pipeline can result in reserving encoding capacity not just for colours that do not occur in a specific input but also for colours that, further along the pipeline, are not printable.

To alleviate this inefficiency, examples described herein involve an approach where, at each stage of an imaging pipeline, just the colours (or single channel properties such as density, tensile strength, elasticity, Young's modulus, opacity, translucency, conductivity, etc.) relevant there are represented. In addition to reducing memory and storage needs, this also results in fewer operations being performed, where these depend just on colour (for example, a mapping from input colour to printable colour, or from printable colour to mvec font format).

Certain examples involve representing colour content by indexing just the colours that are relevant at any given stage of the imaging pipeline.

For example, at the input to a stage of an imaging pipeline, encoded colour differences below a certain threshold are not perceptible, as a result of which the full 16.8 million possible 8-bit RGB value combinations correspond to around 1 million distinct, individually-distinguishable colours, when represented in a visually-uniform colour space. According to certain examples, even for preservation of smooth transitions it would be sufficient to use just a subset of the full encoding potential of the space.

Beyond a representation of visually distinguishable colours, the content of an actual print job will typically use just a fraction of the full colour encoding potential. For example, in a 1024×812 pixel Adobe™ RGB image with rich colour variety (for example, that could be used as a texture map), there are 831,000 unique RGB combinations. However, the colours they represent result in 243,000 unique, differently-perceived pixel colours, given the International Colour Consortium (ICC) CIELAB 8-bit encoding. Representing the pixels of the image as indices into a list of 243,000 uniquely-coloured RGBs would use 18 bits per pixel (allowing for 262K indices), instead of the 24 bits for the full RGB encoding.

When that same image is colour managed to the International Organization for Standardisation (ISO) uncoated (Fogra 29) colour gamut, it uses 179,000 unique colours; this corresponds to a drop to 74% of the original variety. When output is on a 3D printing system that uses just cyan, magenta, yellow (CMY) chromatic colourants, the same image may be reduced to 134,000 unique colourimetries; this corresponds to 55% of the variety of the input. Encoding the colour-managed content in a device colour space according to certain examples can therefore lead to between around 25-50% reduction in colour indices used, even for a very complex image.

According to certain examples, aside from the storage and memory efficiencies, any transformations that are to be performed can be applied to just the indexed colour list and therefore just as many times as there are distinct colours used in a given print job.

Certain examples described herein make use of such custom, content-dependent and pipeline-stage-dependent encoding.

In some examples, the following process is followed:

As a first part of certain examples, at each stage of the pipeline, a list of unique colour values in the input in terms of their representation in a uniform colour space is computed (for example 8-bit CIELAB as was used in the above example). In some examples, an adjustable threshold per colour channel is used to determine uniqueness.

In some examples, the output of the first part comprises a list of indices with corresponding colour coordinates in the input space of a given stage of the pipeline.

As a second part of certain examples, the colours of entities in the input are represented using the indices from the first part. The entities could for example comprises pixels, voxels, tessella, geometries, etc.

As a third part of certain examples, the colour transformation of a given stage of the pipeline is applied to the list of colour coordinates from the first part (for example, map input RGBs to printable RGBs, or printable RGBs to Mvocs (i.e. volume coverages of Mvecs), etc.).

The process then proceeds to the next stage of the pipeline and the first, second and third parts are repeated, and so on until each stage of the pipeline has been processed according to certain examples.

A consequence of the above process according to certain examples is that at each stage, content is represented with a colour granularity relevant to that stage and that each relevant colour is processed just once. Note that the above per-stage quantization approach of certain examples can also be applied to other properties, as long as they can be represented in a space that is uniform in terms of the relevance of that property (or at least a space where relevance is known). For example, if weight, transparency, and/or stiffness differences below some threshold are not relevant, then just those levels of such properties that are above such a threshold are stored and encoded according to examples. Moreover, according to some examples, this is just performed for the levels of these properties (and their combinations) that are present in a given 3D print job.

FIG. 1 is a schematic diagram showing a multi-stage imaging pipeline 100 according to examples. In the examples depicted in FIG. 1, multi-stage imaging pipeline 100 comprises n stages.

A controller 160 controls processing and storage of data through each stage of multi-stage imaging pipeline 100. Controller 160 comprises (or has access to) memory 170 for storing data for each stage of multi-stage imaging pipeline 100. Input data 110 is input to a first stage 120 of multi-stage imaging pipeline 100, whereupon controller 160 controls data processing and storage of data in memory 170 accordingly for first stage 120. Data output from first stage 120 is then passed to second stage 130 of multi-stage imaging pipeline 100, whereupon controller 160 controls data processing and storage of data in memory 170 accordingly for second stage 130. This process continues until the nth stage 140 of multi-stage imaging pipeline 100, which in these examples is the final stage of multi-stage imaging pipeline 100, whereupon controller 160 provides output data 150.

Figure 2:
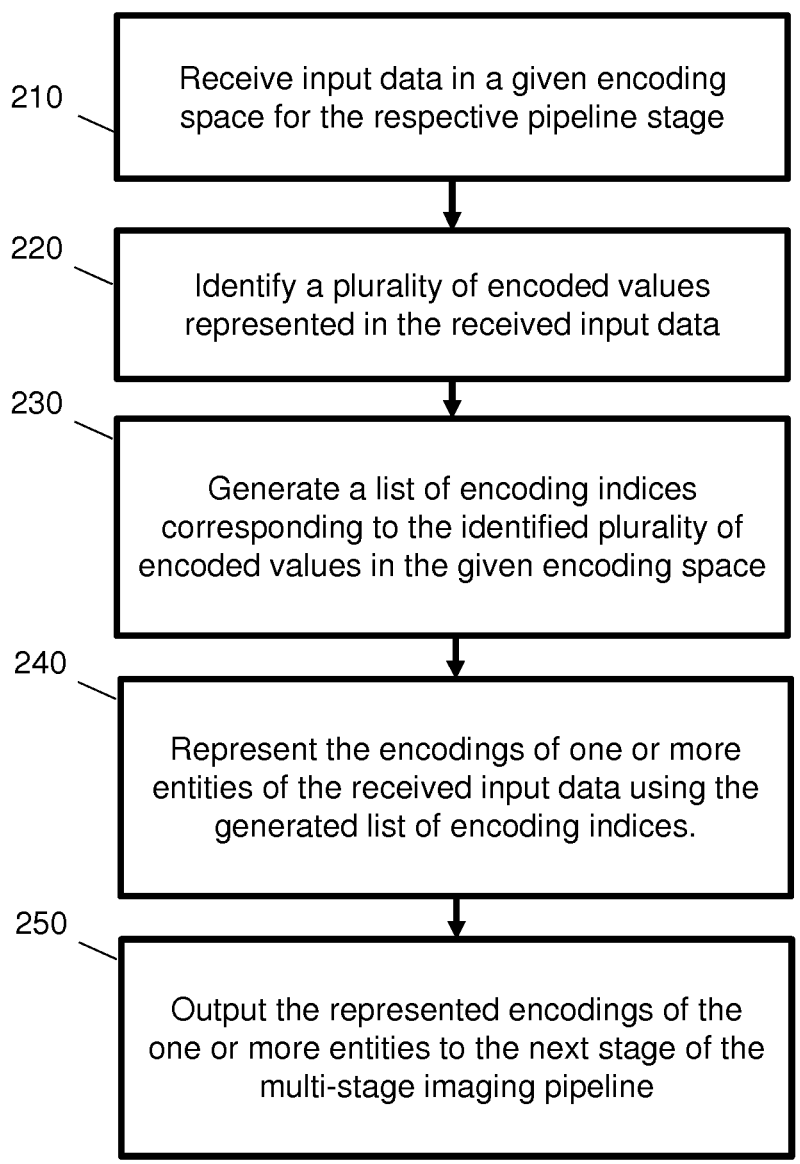
FIG. 2 is a flowchart showing operation of a controller in a printing apparatus for controlling a multi-stage imaging pipeline according to examples.

FIG. 2 is a flowchart 200 showing operation of a controller in a printing apparatus for controlling a multi-stage imaging pipeline according to examples.

The controller (for example controller 160 of FIG. 1) is configured to perform the operations of blocks 210, 220, 230, 240 and 250 for each stage of a multi-stage imaging pipeline (for example multi-stage imaging pipeline 100 of FIG. 1).

At block 210, input data in a given encoding space (for example a given colour space) is received for the respective pipeline stage.

At block 220, a plurality of encoded values (for example colour values) represented in the received input data is identified. In such examples, the identified plurality of encoded values comprises a subset of encoded values which are capable of being represented in the given encoding space.

At block 230, a list of encoding indices (for example colour indices) corresponding to the identified plurality of encoded values in the given encoding space is generated.

At block 240, the encodings (for example the colours) of one or more entities of the received input data are represented using the generated list of encoding indices.

At block 250, the represented encodings (for example colours) of the one or more entities are output to the next stage of the multi-stage imaging pipeline.

The process continues until processing for each stage of the multi-stage imaging pipeline has been controlled and data has been output from the final stage of the multi-stage imaging pipeline.

In certain examples, the plurality of identified encoded values comprises a plurality of encoded values which are functionally distinguishable for a predetermined application.

In certain examples, the plurality of identified encoding values comprises a plurality of visually-distinguishable colour values.

In certain examples, the given encoding space comprises a uniform encoding space, for example a uniform colour space.

In certain examples, the controller is configured to, at each stage of the multi-stage imaging pipeline, apply a quantisation threshold per encoding channel (for example colour channel) when identifying the plurality of encoded values. In some such examples, the applied quantisation threshold is configurable for each stage of the multi-stage imaging pipeline.

In certain examples, the generated list of encoding indices comprises corresponding encoding coordinates (for example colour coordinates) in the given encoding space of the respective pipeline stage.

In certain examples, the controller is configured to, at each stage of the multi-stage imaging pipeline, apply an encoding transformation (for example a colour transformation) of the respective pipeline stage to the corresponding encoding coordinates in the given encoding space of the respective pipeline stage; in such examples, the outputting to the next stage of the multi-stage imaging pipeline is carried out at least in part on the results of the applied encoding transformation.

In certain examples, the one or more entities of the received input data comprise one or more of pixels, voxels, tessella, and geometries.

In certain examples, the encoding space is associated with one or more of colour, density, tensile strength, elasticity, Young's modulus, opacity, translucency, and conductivity.

Figure 3:
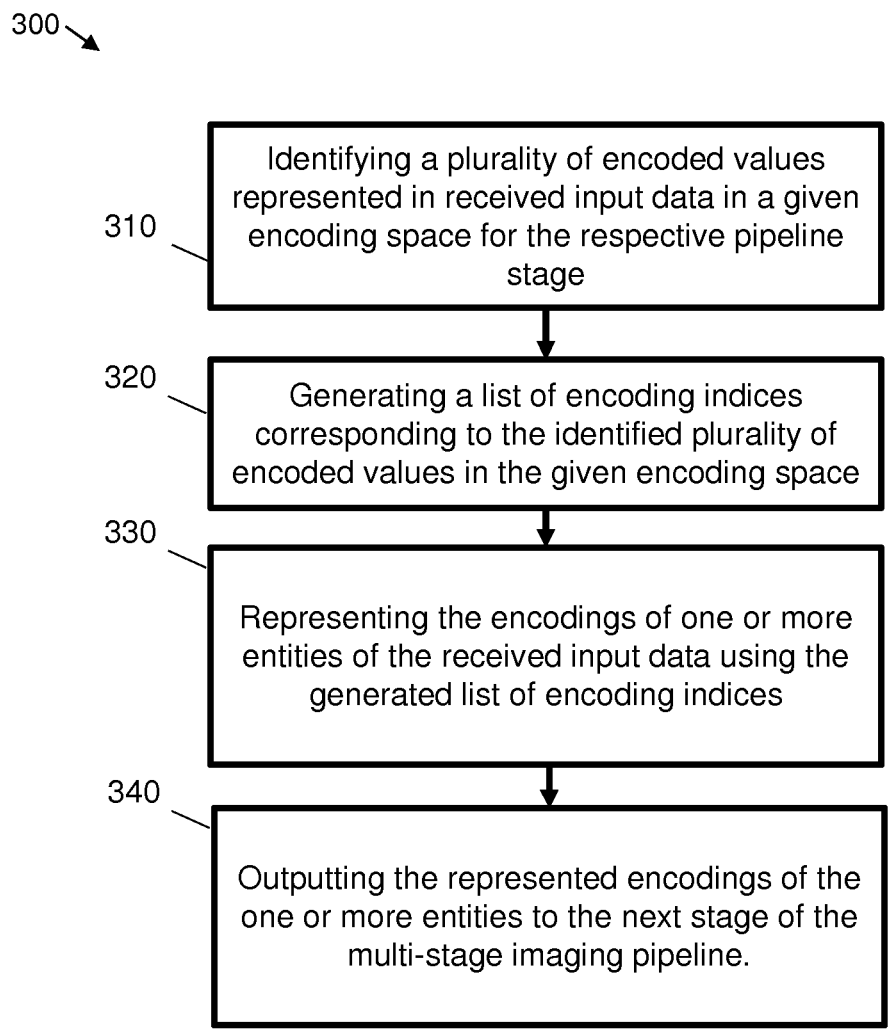
FIG. 3 is a flowchart showing a method of processing data in a multi-stage imaging pipeline according to examples.

FIG. 3 is a flowchart 300 showing a method of processing data in a multi-stage imaging pipeline according to examples.

The operations of blocks 310, 320, 330 and 340 are performed for each stage of a multi-stage imaging pipeline (for example multi-stage imaging pipeline 100 of FIG. 1).

Block 310 comprises identifying a plurality of encoded values represented in received input data in a given encoding space for the respective pipeline stage; in such examples, the identified plurality of encoded values comprises a subset of encoded values which are capable of being represented in the given encoding space.

Block 320 comprises generating a list of encoded indices corresponding to the identified plurality of encoded values in the given encoding space.

Block 330 comprises representing the encodings of one or more entities of the received input data using the generated list of encoding indices.

Block 340 comprises outputting the represented encodings of the one or more entities to the next stage of the multi-stage imaging pipeline.

In certain examples, the generated list of encoding indices comprises corresponding encoding coordinates in the given encoding space of the respective pipeline stage; such examples involve applying an encoding transformation of the respective pipeline stage to the corresponding encoding coordinates in the given encoding space of the respective pipeline stage. In such examples, the outputting to the next stage of the multi-stage imaging pipeline is carried out at least in part on the results of the applied encoding transformation.

In certain examples, the plurality of identified encoded values comprises a plurality of visually-unique colour values.

In certain examples, the plurality of identified encoded values comprises a plurality of encoded values which are functionally distinguishable for a predetermined application.

In certain examples, the given encoding space comprises a uniform encoding space, for example a visually-uniform colour space.

Certain examples comprise applying a quantisation threshold per channel (for example colour channel) when identifying the plurality of encoded values. In some such examples, the applied quantisation threshold is independently configurable for each pipeline stage.

Figure 4:
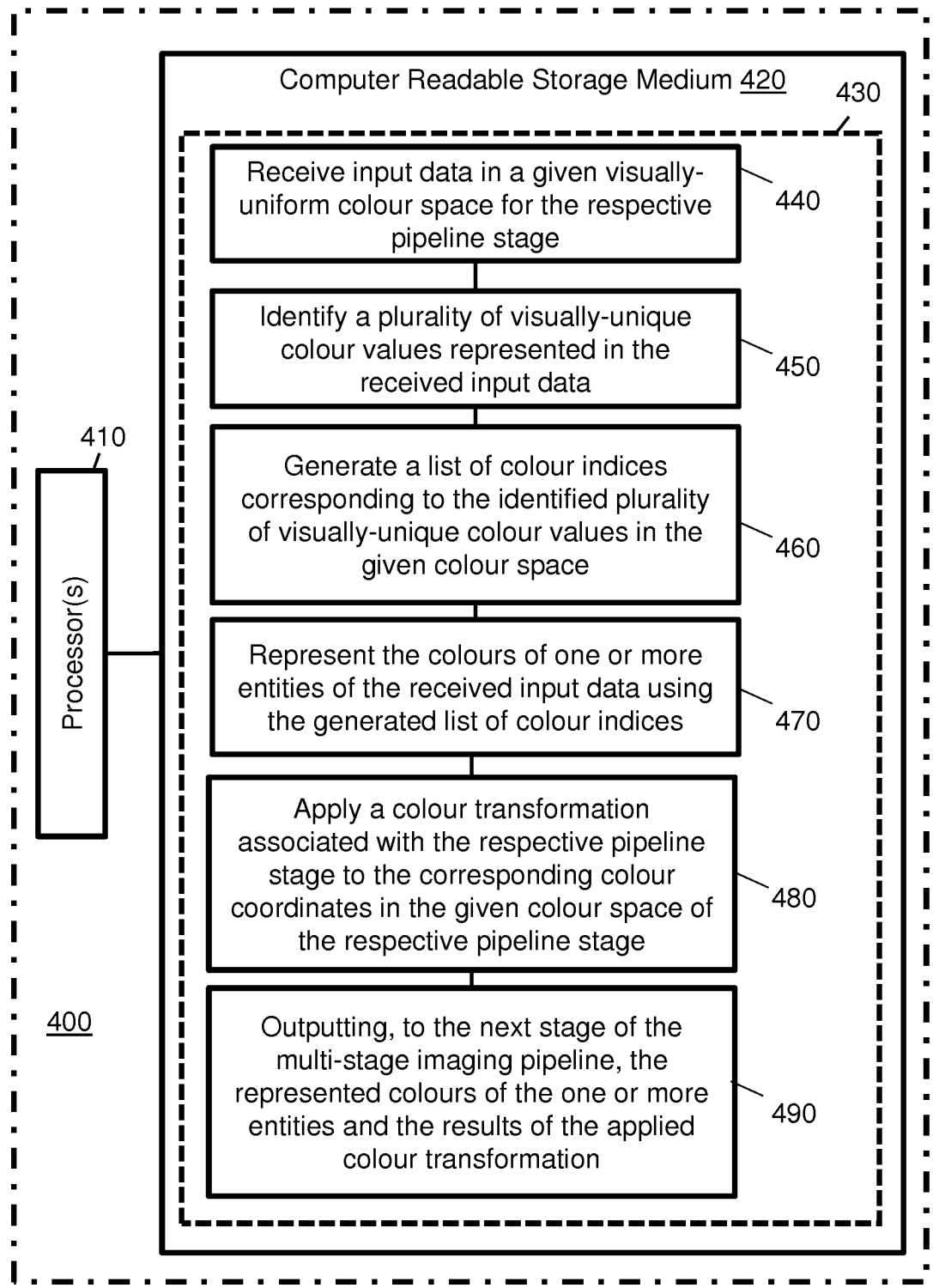
FIG. 4 is a schematic illustration of a processing device according to examples.

Certain system components and methods described herein may be implemented by way of machine readable instructions that are storable on a non-transitory storage medium. FIG. 4 shows an example of a three-dimensional printing system or device 400 comprising at least one processor 410 arranged to retrieve data from a computer-readable storage medium 420. The computer-readable storage medium 420 comprises a set of computer-readable instructions 430 stored thereon. The at least one processor 410 is configured to load the instructions 430 into memory for processing. The instructions 430 are arranged to cause the at least one processor 410 to perform a series of actions for each stage of a multi-stage imaging pipeline.

Instruction 440 is configured to cause the processer 410 to receive input data in a given visually-uniform colour space for the respective pipeline stage.

Instruction 450 is configured to cause the processer 410 to identify a plurality of visually-unique colour values represented in the received input data; the identified plurality of visually-unique colour values comprise a subset of colour values which are capable of being represented in the given visually-uniform colour space.

Instruction 460 is configured to cause the processer 410 to generate a list of colour indices corresponding to the identified plurality of visually-unique colour values in the given colour space; the generated list of colour indices comprises corresponding colour coordinates in the given colour space of the respective pipeline stage.

Instruction 470 is configured to cause the processer 410 to represent the colours of one or more entities of the received input data using the generated list of colour indices.

Instruction 480 is configured to cause the processer 410 to apply a colour transformation associated with the respective pipeline stage to the corresponding colour coordinates in the given colour space of the respective pipeline stage.

Instruction 490 is configured to cause the processer 410 to output, to the next stage of the multi-stage imaging pipeline, the represented colours of the one or more entities and the results of the applied colour transformation.

The non-transitory storage medium can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

Certain examples improve memory, storage and/or processing footprints which are relevant issues in 3D printing. Moreover, such factors will become more and more relevant as control over more print properties is provided. Colour control in 3D printing will benefit from certain examples described herein and will allow for faster processing throughput with a lower storage and memory footprint.

Certain examples have been described herein in relation to 3D printing. Certain examples can also be applied in other additive manufacturing processes and also to two dimensional (2D) printing.

Another use of certain examples is to turn the process around and start with the granularity of the final, at-voxel content and propagate it upstream (for example Mvocs to printable object properties at appropriate granularity). Given that this would result in the smallest possible set of full-combinations that are relevant, the possibility of a fully-populated look up table where no interpolation is involved becomes practical and results in increased throughput of an imaging pipeline. This is achieved by following the above examples, but instead of starting with the content of a particular print job, the starting point is the full input space (for example, an 8-bit RGB cube in the case of colour).

Certain examples described herein may use a smaller amount of memory than known systems.

Certain examples described herein may be implemented using a slower (hence cheaper and/or less power consuming) processor(s) then known systems.

Certain examples described herein may exhibit improved processing speeds over known systems.

The preceding description has been presented to illustrate and describe examples of the principles described. This description is not intended to be exhaustive or to limit these principles to any precise form disclosed. Many modifications and variations are possible in light of the above teaching.

The invention claimed is:

1. A printing apparatus comprising:
   a controller configured to, at each stage of a multi-stage imaging pipeline:
      receive input data in a given color space for the respective pipeline stage;
      identify a plurality of color values represented in the received input data, the identified plurality of color values comprising a subset of color values which are capable of being represented in the given color space;
      generate a list of color indices corresponding to the identified plurality of color values in the given color space;
      represent the colors of one or more entities of the received input data using the generated list of color indices; and
      output the represented colors of the one or more entities to the next stage of the multi-stage imaging pipeline.

2. The printing apparatus of claim 1, wherein the plurality of identified color values comprises a plurality of color values which are functionally distinguishable for a predetermined application.

3. The printing apparatus of claim 1, wherein the given color space comprises a uniform color space.

4. The printing apparatus of claim 1, wherein the controller is configured to, at each stage of the multi-stage imaging pipeline, apply a quantisation threshold per color channel when identifying the plurality of color values.

5. The printing apparatus of claim 4, wherein the applied quantisation threshold is configurable for each stage of the multi-stage imaging pipeline.

6. The printing apparatus of claim 1, wherein the generated list of color indices comprises corresponding color coordinates in the given color space of the respective pipeline stage.

7. The printing apparatus of claim 6, wherein the controller is configured to, at each stage of the multi-stage imaging pipeline, apply a color transformation of the respective pipeline stage to the corresponding color coordinates in the given color space of the respective pipeline stage,
wherein the outputting to the next stage of the multi-stage imaging pipeline is carried out at least in part on the results of the applied color transformation.

8. The printing apparatus of claim 1, wherein the one or more entities of the received input data comprise one or more of:
pixels,
voxels,
tessella, and
geometries.

9. The printing apparatus of claim 1, wherein the identified plurality of color values comprises a subset of color values that are visually-distinguishable color values.

10. The printing apparatus of claim 1, wherein an entity comprises a pixel.

11. A method of processing data in a multi-stage imaging pipeline, the method comprising:
at each stage of the multi-stage imaging pipeline:
identifying a plurality of color values represented in the received input data in a given stage for the respective pipeline stage, the identified plurality of color values comprising a subset of color values which are capable of being represented in the given color space;
generating a list of color indices corresponding to the identified plurality of color values in the given color space;
representing the colors of one or more entities of the received input data using the generated list of color indices; and
outputting the represented colors of the one or more entities to the next stage of the multi-stage imaging pipeline.

12. The method of claim 11, wherein the generated list of color indices comprises corresponding color coordinates in the given color space of the respective pipeline stage, the method comprising:

applying a color transformation of the respective pipeline stage to the corresponding color coordinates in the given color space of the respective pipeline stage,
wherein the outputting to the next stage of the multi-stage imaging pipeline is carried out at least in part on the results of the applied color transformation.

13. The method of claim 11, wherein the plurality of identified color values comprises a plurality of color values which are functionally distinguishable for a predetermined application, and
wherein the given color space comprises a uniform color space.

14. The method of claim 11, comprising applying a quantisation threshold per color channel when identifying the plurality of color values.

15. The method of claim 14, wherein the applied quantisation threshold is independently configurable for each pipeline stage.

16. A non-transitory computer-readable storage medium storing instructions that, when executed by a processor of a three-dimensional printing system, cause the processor to, at each stage of a multi-stage imaging pipeline:
receive input data in a given visually-uniform color space for the respective pipeline stage;
identify a plurality of visually-unique color values represented in the received input data, the identified plurality of visually-unique color values comprising a subset of color values which are capable of being represented in the given visually-uniform color space;
generate a list of color indices corresponding to the identified plurality of visually-unique color values in the given color space, the generated list of color indices comprising corresponding color coordinates in the given color space of the respective pipeline stage;
represent the colors of one or more entities of the received input data using the generated list of color indices;
apply a color transformation associated with the respective pipeline stage to the corresponding color coordinates in the given color space of the respective pipeline stage; and
output, to the next stage of the multi-stage imaging pipeline, the represented colors of the one or more entities and the results of the applied color transformation.

* * * * *